J. TOWNSEND.
Wheel Cultivator.
No. 51,365.
2 Sheets—Sheet 2.
Patented Dec. 5, 1865.
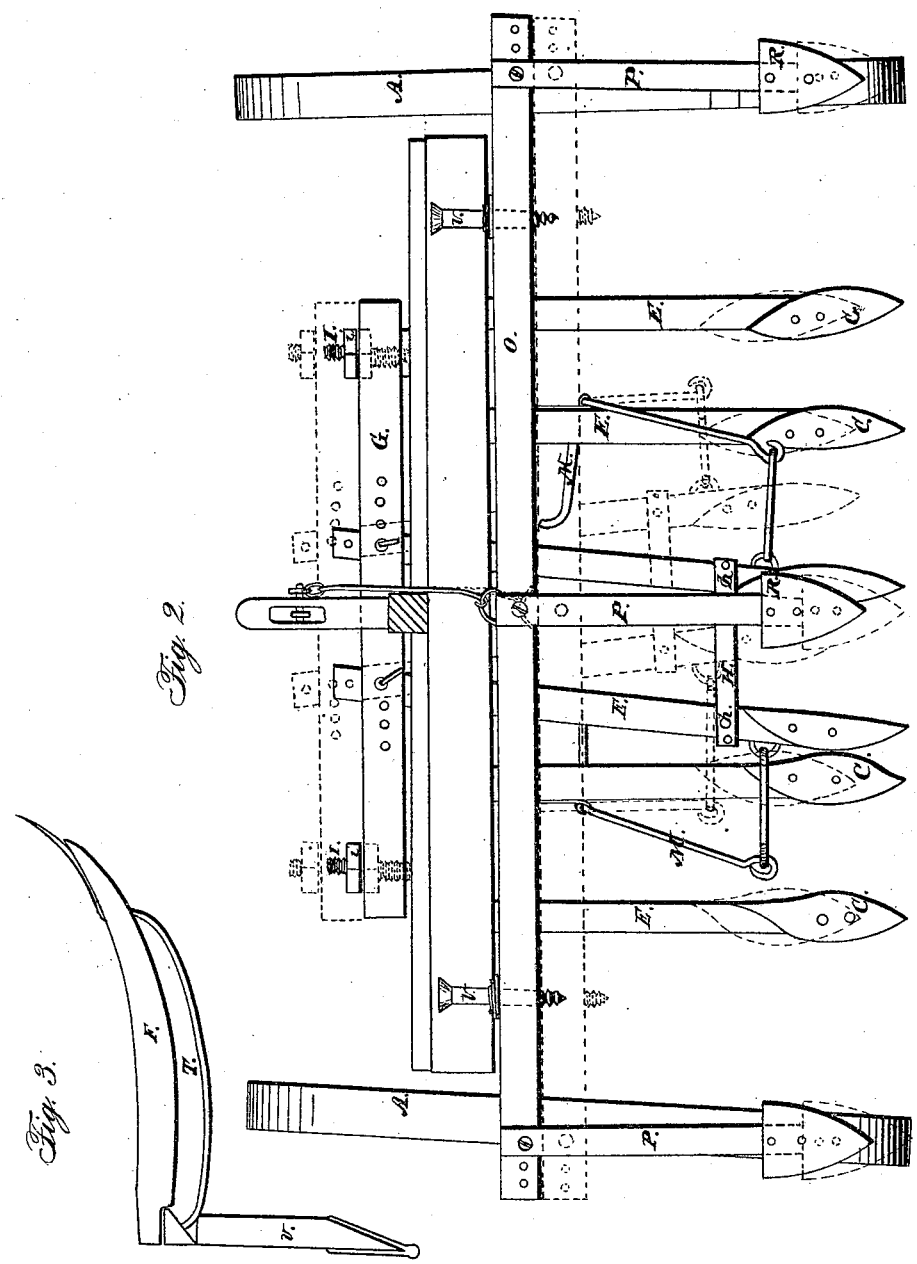
Witnesses:
Amy Bowne
E. Breed
Inventor:
James Townsend
By his Attorney
Daniel Breed

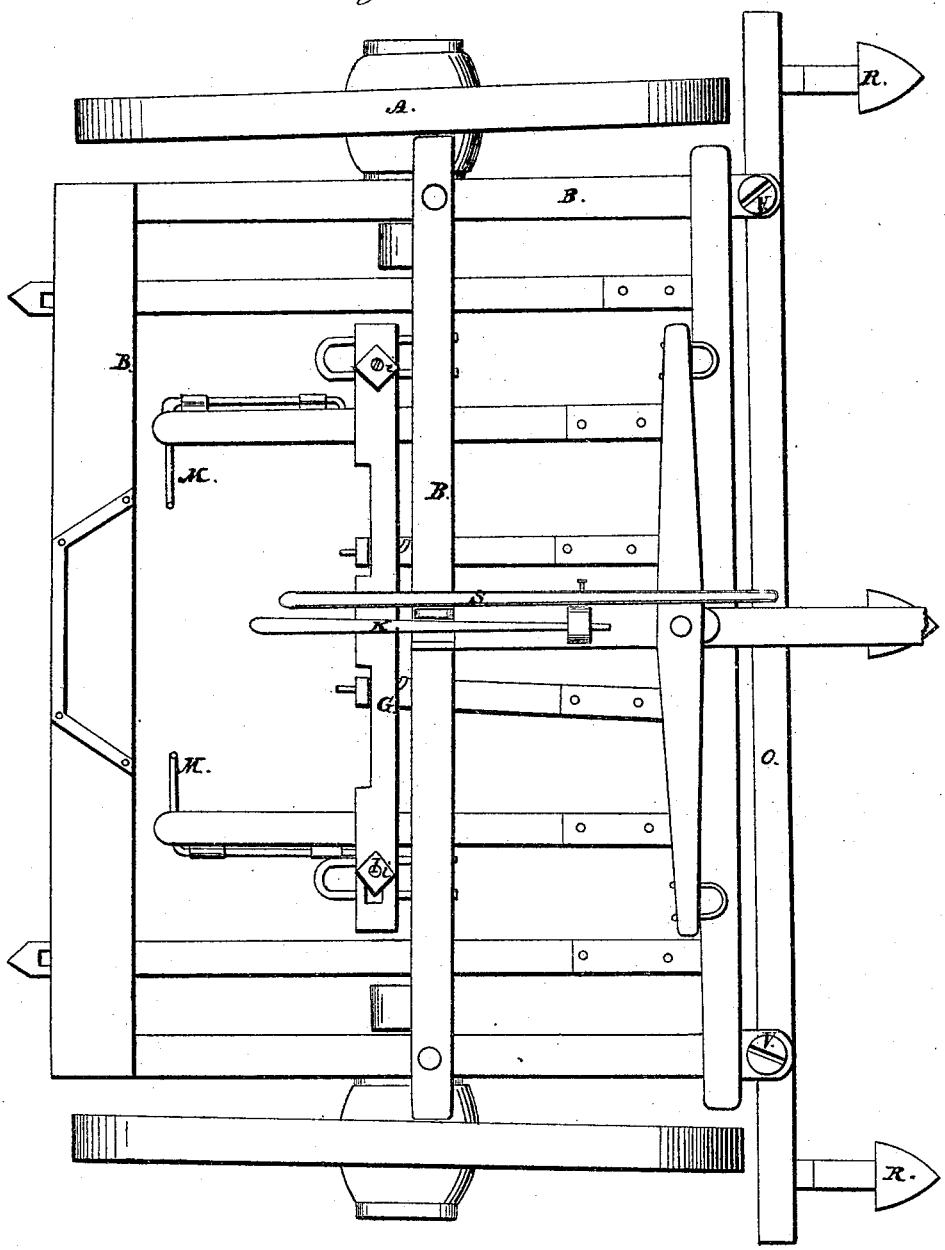

UNITED STATES PATENT OFFICE.

JAMES TOWNSEND, OF HEAD OF SASSAFRAS, MARYLAND.

IMPROVEMENT IN CULTIVATORS.

Specification forming part of Letters Patent No. 51,365, dated December 5, 1865.

*To all whom it may concern:*

Be it known that I, JAMES TOWNSEND, of Head of Sassafras, in the county of Kent and State of Maryland, have invented a new and useful Improvement in Cultivators; and I do hereby declare that the following is a full and exact description thereof, reference being had to the accompanying drawings, and to the letters of reference marked thereon.

My invention consists in a peculiar construction and arrangement of cultivators provided with markers for laying off cross-rows.

In the accompanying drawings, Figure 1 is a top view of my machine. Fig. 2 is a front view of the same.

My machine is mounted on a pair of wheels, A, intended to be drawn by a pair of horses, the horses and wheels traveling between the rows in the usual manner. The frame B is elevated above the hubs of the wheels, so as to pass the tops of tall corn.

The machine is provided with six double-pointed teeth or shovels, C, Fig. 2, of peculiar shape, the upper surface of the shovel being a concave twist, so as to loosen up the ground and turn the same in small furrows toward the row of corn.

In the center of the machine a bridge or guard, D, is carried above the small corn to prevent the middle shovels from turning lumps of earth upon the young plants. This bridge or guard must be removed for cultivation of larger corn.

The teeth or shovels C are fastened to shanks E, attached to beams F, Fig. 1. These beams are all hinged to the front bar of the frame A, in the usual manner, so that the shovels or teeth may be raised or lowered at pleasure. The shanks E of the two middle teeth or shovels are secured to the lifting-bar G by means of pins, which also serve to adjust the shanks either laterally or vertically, several holes being made in the shanks and in the bar to receive the pins. These two shanks are also connected by a small cross-bar, H, and pivots $h$, Fig. 2. The beams of the two right-hand shovels are connected by a cross-bar, into which the rod I is inserted, and by means of which the beams are connected to the lifting-bar G. The two left-hand shovels are in like manner connected together and to the lifting-bar G, so that the driver with his hand upon lever K can easily raise all of the teeth or shovels C at the same time. The two right-hand shovels, and also the left, may be adjusted in relation to the bar G by means of the screw-rods I and nuts $i$.

A pair of stirrups, M, Figs. 1 and 2, enable the driver to give a lateral motion to the two middle shovels in order to prevent covering the corn or plowing too near the row. The motion of these shovels sidewise and also their up-and-down motion are indicated in Fig. 2 by red and black lines. The stirrups also enable the driver to press the shovels into hard ground.

On the front part of frame A is arranged a bar, carrying three shanks, P, and shovels or markers R, for marking cross-rows. In the working machine this bar O is made very long, extending far beyond the wheels, and the outer shovels are placed near the end of the bar, so that the tread of the wheel comes midway between the outer shovel and the middle one or midway between the rows. This bar O is attached to swinging arms U, Fig. 3. The rear ends, $u$, of these arms are hinged to the under side of frame A, so that the bar O and its shovels may be elevated or depressed at pleasure by means of lever S. The motion of this bar and the shovels is indicated by red lines in Fig. 2. Two adjusting-screws, V, regulate the extent of this motion. This arrangement is very convenient for marking cross-rows for planting Indian corn. The bar O and its shovels are made removable, so as to be laid aside when cultivating corn with the same machine.

The shanks P are supported by peculiar curved braces, T, Fig. 3, thus allowing the shanks and bar O to be made much smaller and yet of sufficient strength. This brace is very strong, and from its position it is not liable to catch and drag weeds or grass.

I do not broadly claim double-pointed and reversible teeth or shovels for preventing the necessity of frequent sharpening; but I believe the peculiar curved and twisted form of the teeth is new. Neither do I broadly claim so arranging the shovels as to raise them or lower them all at once; but I believe my arrangement of the shovels and the lifting-bar G is peculiar and different from all others and very convenient.

Having thus fully described my invention, what I claim, and desire to secure by Letters Patent of the United States, is—

1. The arrangement and combination of the lifting-bar G, lever K, with the beams F, made adjustable up and down, and also capable of being swung laterally by the stirrups M, substantially in the manner and for the purposes set forth.

2. The use of the hinged bar O, carrying the shanks P, and markers R, the bar being provided with adjusting-screws V, and operated by the lever S, substantially as described.

JAMES TOWNSEND.

Witnesses:
 DANIEL BREED,
 ROBERT S. GRIFFITH.